UNITED STATES PATENT OFFICE.

JOHN E. YOST, OF ARKANSAS CITY, KANSAS.

YEAST COMPOUND.

No. 889,082. Specification of Letters Patent. Patented May 26, 1908.

Application filed March 16, 1907. Serial No. 362,705.

*To all whom it may concern:*

Be it known that I, JOHN E. YOST, a citizen of the United States, and a resident of Arkansas City, in the county of Cowley and State of Kansas, have invented a new and Improved Yeast Compound, of which the following is a full, clear, and exact description.

This invention is an improved dry yeast compound embodying in its composition a body on which the yeast is dried having a large capacity for the ferment used. This body consists of bread, preferably in the form of crumbs, which are dipped into a ferment as that taken from beer or ale tanks or fermented in the common way in mixtures of water, malt, potatoes, sugar, hops, etc.

On experiment I find that 30% of bread will furnish a body for as much yeast as 80% of corn-meal which is at the present time used, thus giving an equal baking strength in about one-half the weight and in about two-thirds bulk if the bread is pulverized after it is dry.

In carrying out my invention, I preferably form the yeast or ferment of ingredients consisting of water, potatoes, hops, sugar and yeast, which are combined in the proportions and in the manner hereinafter outlined.

In a perforated vessel are placed 10 parts of pared potatoes, which are set into a second vessel containing 82 parts of water. In a cheese-cloth bag is inclosed 1 part of hops, which is placed in the vessel with the potatoes and boiled until the potatoes become soft, when the latter are removed and mashed. The bag of hops is also removed and the water employed in scalding 3 parts of sugar combined with 1 part of salt. The mashed potatoes are thereafter added to this water and the whole allowed to cool to about 80 or 90° Fahrenheit, when 3 parts of yeast are added and allowed to ferment for about eighteen hours. During this fermentation the best and major part of the yeast will settle to the lower half of the vessel, admitting of the upper half being easily separated by pouring it off.

The yeast or ferment is now ready for use and is employed in forming my improved yeast compound by dipping bread crumbs of any suitable size into the settlings and allowing the same to stand until the crumbs become thoroughly saturated, whereby the liquid containing the yeast ferment is uniformly distributed therethrough. The crumbs are thereafter removed and placed on trays to dry, which, when completed, are packed into packages in this form for the market, or before packing are pulverized and sold in this finely divided state.

Having thus described my invention I claim as new and desire to secure by Letters Patent:

1. The herein described yeast compound, which consists of a body composed of bread having a yeast ferment uniformly distributed therethrough and dried thereon.

2. The herein described yeast compound, consisting of a body composed of bread crumbs having a yeast ferment uniformly distributed therethrough and dried thereon.

3. The herein described process of making a yeast compound, which consists in saturating bread in a liquid containing a yeast ferment, and thereafter drying the ferment on the bread.

In testimony whereof I have signed my name to this specification in the presence of two subscribing witnesses.

JOHN E. YOST.

Witnesses:
C. W. STEPHENS,
S. J. GILBERT.